United States Patent
Baba et al.

(10) Patent No.: US 10,302,959 B2
(45) Date of Patent: May 28, 2019

(54) OPTICAL DEVICE

(71) Applicant: TOYODA GOSEI CO., LTD., Kiyosu-shi, Aichi-ken (JP)

(72) Inventors: Kazumasa Baba, Kiyosu (JP); Hiromitsu Takeuchi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 120 days.

(21) Appl. No.: 15/630,205

(22) Filed: Jun. 22, 2017

(65) Prior Publication Data

US 2017/0371174 A1    Dec. 28, 2017

(30) Foreign Application Priority Data

Jun. 27, 2016 (JP) .................. 2016-126658

(51) Int. Cl.
*H02N 2/10* (2006.01)
*G02B 26/06* (2006.01)
*G02B 27/48* (2006.01)

(52) U.S. Cl.
CPC ............ *G02B 27/48* (2013.01); *G02B 26/06* (2013.01); *H02N 2/10* (2013.01); *H02N 2/108* (2013.01)

(58) Field of Classification Search
CPC ........ G02B 27/48; G02B 26/06; H02N 2/108; H02N 2/10
See application file for complete search history.

(56) References Cited

U.S. PATENT DOCUMENTS

| 2010/0309536 A1* | 12/2010 | Akanuma | G02B 26/0858 359/200.8 |
| 2016/0091728 A1* | 3/2016 | Ogura | H04N 9/3161 353/38 |
| 2017/0371175 A1* | 12/2017 | Baba | G02B 7/00 |

FOREIGN PATENT DOCUMENTS

JP    2015-138083 A    7/2015

* cited by examiner

*Primary Examiner* — Kimberly N. Kakalec
(74) *Attorney, Agent, or Firm* — Posz Law Group, PLC

(57) ABSTRACT

An optical device includes: a piezoelectric element of a sheet shape; a restriction section attached to the piezoelectric element, the restriction section configured to restrict a movable area in the piezoelectric element to a polygonal predetermined region; an optical element attached to the movable area of the piezoelectric element; and a plurality of electrodes disposed on the piezoelectric element, the plurality of electrodes configured to be applied with voltage independently, wherein: the electrodes are disposed at adjacent two corners in the movable area; and the piezoelectric element expands and contracts based on voltage applied to the electrodes in a manner that a periphery of the corner where the electrode is disposed in the movable area expands and contracts in multiple directions including two directions along two sides forming the corner.

4 Claims, 5 Drawing Sheets

OPTICAL DEVICE

CROSS-REFERENCE TO RELATED APPLICATION(S)

This application is based upon and claims the benefit of priority from Japanese Patent Application No. 2016-126658, filed on Jun. 27, 2016, the entire contents of which are incorporated herein by reference.

BACKGROUND

1. Field of the Invention

The present invention relates to optical devices.

2. Description of the Related Art

In an optical apparatus which displays an image on a screen using laser light as an optical source, it is known that speckle (flickering or glaring of light generated irregularly) occurs on the screen due to coherence (interference) property of light. Such speckle causes degradation of display quality and visibility.

JP-A-2015-138083 discloses an optical device for eliminating speckle. The optical device disclosed in JP-A-2015-138083 is configured of an optical element (diffusion plate) and a driving mechanism for operating the optical element. The optical device displaces the optical element disposed on an optical path of laser light with the driving mechanism, thereby suppressing the interference property of laser light to eliminate speckle.

The optical device of JP-A-2015-138083 utilizes a piezoelectric element made of an electroactive polymer material as the driving mechanism. The driving mechanism utilizing the piezoelectric element expands and contracts the piezoelectric element based on voltage applied thereto, and displaces the optical element with a force generated according to the expansion and contraction operation.

JP-A-2015-138083 discloses the driving mechanism using the piezoelectric element, the driving mechanism displacing the optical element so that the optical element is vibrated or rotated on the plane along the piezoelectric element. On the other hand, JP-A-2015-138083 avoids any mention of the feature corresponding to the configuration which can displace the optical element in a direction of changing an inclination angle thereof with respect to the optical axis when the optical element is disposed on the optical axis of the laser light. Since force generated according to expansion and contraction operation of a piezoelectric element is very weak when compared with a driving mechanism of motor etc., it is difficult to lift a part of an optical element so that the optical element is inclined by using the piezoelectric element.

SUMMARY

The invention has been contrived bearing in mind the heretofore described circumstances, and an object of the invention is to provide an optical device which can displace an optical element in a direction of changing an inclination angle thereof with respect to an optical axis, by using a piezoelectric element.

In order to attain the object, an optical device according to an aspect of the invention includes: a piezoelectric element of a sheet shape; a restriction section attached to the piezoelectric element, the restriction section configured to restrict a movable area in the piezoelectric element to a polygonal predetermined region; an optical element attached to the movable area of the piezoelectric element; and a plurality of electrodes disposed on the piezoelectric element, the plurality of electrodes configured to be applied with voltage independently, wherein: the electrodes are disposed at adjacent two corners in the movable area; and the piezoelectric element expands and contracts based on voltage applied to the electrodes in a manner that a periphery of the corner where the electrode is disposed in the movable area expands and contracts in multiple directions including two directions along two sides forming the corner.

According to this configuration, the optical element can be displaced in a direction of changing an inclination angle thereof with respect to an optical axis.

In the optical device, preferably, the optical device is used in an installation state in which the piezoelectric element crosses a horizontal plane, and the electrodes are disposed at adjacent two corners in the movable area that locate on an upper side than a center of gravity of the optical element.

In this case, even if the optical device is used in the installation state in which the piezoelectric element crosses the horizontal plane, the optical element can be suitably displaced in the direction of changing the inclination angle thereof with respect to the optical axis.

In the optical device, preferably, the movable area has a quadrangle shape, a hexagonal shape or an octagonal shape, and the electrodes are disposed at the adjacent two corners and further at two corners located at diagonal positions of the adjacent two corners, in the movable area.

In this case, the optical element can be displaced in further complicated and various manners.

In order to attain the object, an optical device according to another aspect of the invention includes: a piezoelectric element of a sheet shape; a restriction section attached to the piezoelectric element, the restriction section configured to restrict a movable area in the piezoelectric element to a predetermined region; an optical element attached to the movable area of the piezoelectric element; and a plurality of electrodes disposed on the piezoelectric element, the plurality of electrodes configured to be applied with voltage independently, wherein: the optical device is used in an installation state in which the piezoelectric element is orthogonal to a horizontal plane; the piezoelectric element is disposed at a position in which the piezoelectric element does not overlap with a center of gravity of the optical element when the optical device is viewed in a vertical direction; and the electrodes are each disposed on an upper side than the center of gravity of the optical element, and are respectively disposed on both sides of a vertical plane which passes the center of gravity of the optical element and is orthogonal to the piezoelectric element.

According to this configuration, the optical element can be displaced in a direction of changing the inclination angle thereof with respect to the optical axis.

According to the optical device of the invention, the optical element can be displaced in the direction of changing the inclination angle thereof with respect to the optical axis.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

An embodiment according to the invention will be explained.

Figure 1:
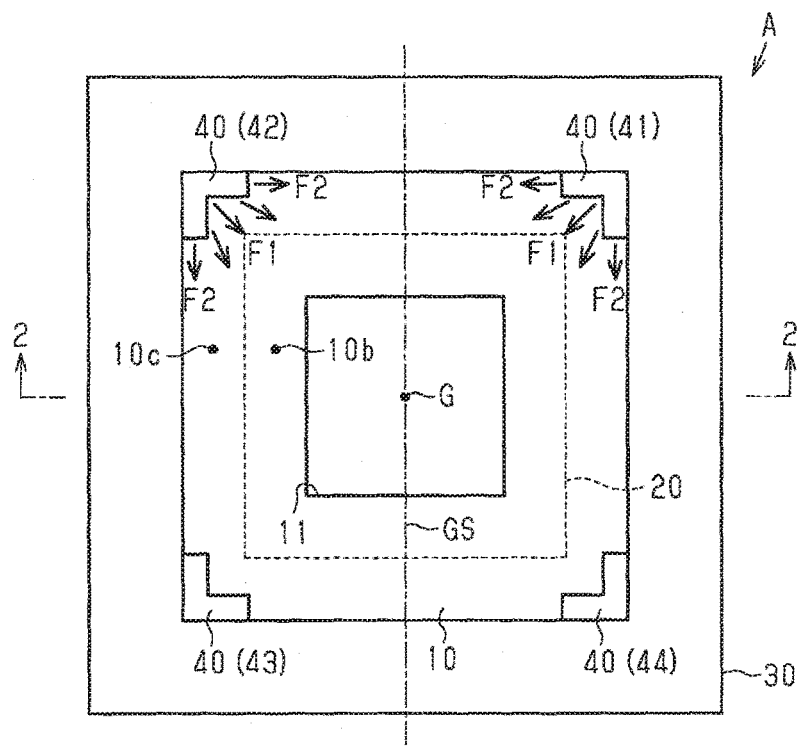
FIG. 1 is a plan view of an optical device.
Figure 2:
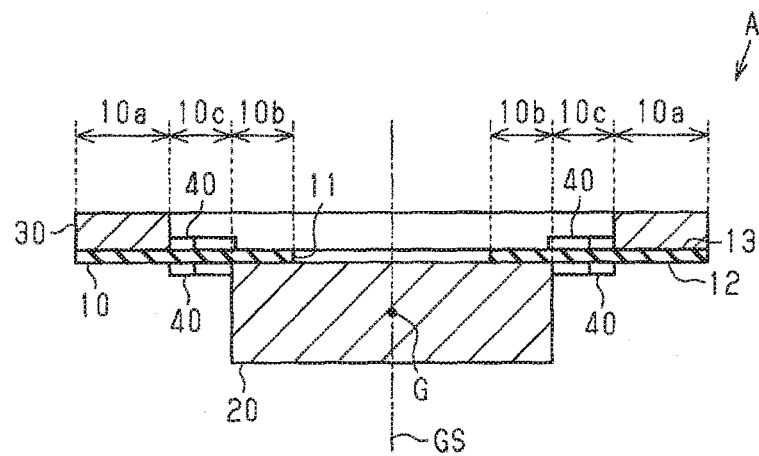
FIG. 2 is a sectional diagram taken along line 2-2 in FIG. 1.
Figure 3:
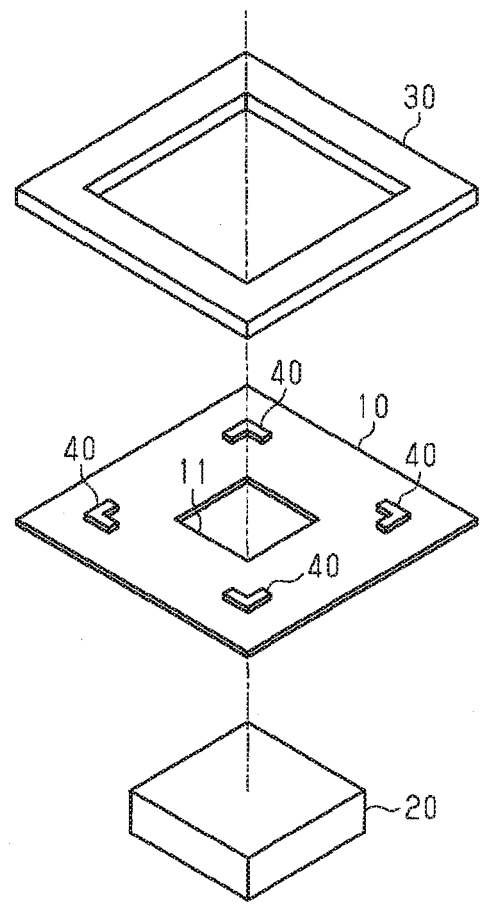
FIG. 3 is an exploded perspective view of the optical device.

As illustrated in FIGS. 1 to 3, an optical device A includes a sheet-shaped piezoelectric element 10 having a quadrangle shape in a plan view. The piezoelectric element 10 is a member which expands and contracts in its surface direction based on voltage applied thereto. A through hole 11, acting as a path of laser light, is formed at the center portion of the piezoelectric element 10. A shape of the through hole 11 is not limited to particular one. The figures show a case in which the through hole 11 has a quadrangle shape as an example.

As the piezoelectric element 10, a known piezoelectric element made of an electroactive polymer material, such as dielectric elastomer, electrostrictive relaxer ferroelectric polymer, piezoelectric polymer, ferrodielectric polymer, electrostriction polymer, liquid crystal polymer, ionic polymer metallic composite, mechanochemical polymer, mechanochemical gel, ion-exchange resin membrane metal complex or polymer carbon nanotube, can be used.

An optical element 20 is fixed on a first surface 12 as one side surface of the piezoelectric element 10. The optical element 20 is a plate member having a square shape in a plan view. The optical element is glued to a center-side portion of the first surface 12 of the piezoelectric element 10 so as to close the through hole 11.

A known optical element used for reducing speckle can be employed as the optical element 20. A concrete example of the optical element 20 has the following structure, That is, a light transmissive region, which transmits light, is divided into areas each having a predetermined length to form a checkerboard pattern, a hexagonal pattern or the like. A wave plate of 214 to 212 having a fine structure is formed on each of the divided surface areas such that optical axis directions of light differ randomly among the individual divided surface areas. A material of the optical element 20 is, for example, a dielectric material such as synthetic quartz, optical glass or plastics or a light transmissive material.

In the piezoelectric element 10, a restriction section 30 having a quadrangle frame shape is fixed on a second surface 13 positioned on the opposite side of the first surface 12. Outer circumference of the restriction section 30 has the same shape as outer circumference of the piezoelectric element 10. Inner circumference of the restriction section 30 has a quadrangle shape larger than outer circumference of the optical element 20. The restriction section 30 is glued to an outer circumferential side part of the second surface 13 of the piezoelectric element 10 such that the optical element 20 is disposed inside the restriction section in a plan view.

As shown in FIGS. 1 and 2, the piezoelectric element 10 includes, in a plan view, a first fixed part 10a glued to the restriction section 30, a second fixed part 10b glued to the optical element 20, and a non-fixed part 10c not glued to the optical element 20 or the restriction section 30. As described above, the piezoelectric element 10 is a member that expands and contracts in a surface direction thereof based on voltage applied thereto. The first fixed part 10a and the second fixed part 10b are glued to the restriction section 30 and the optical element 20, and hence positionally fixed with respect to the restriction section 30 and the optical element 20. Thus, each of the first and second fixed parts does not expand or contract. A movable area of the piezoelectric element 10 capable of expanding and contracting is the non-fixed part 10c. The movable area (outer shape) of the non-fixed part has a shape restricted by the inner circumference of the restriction section 30, that is, a quadrangle shape.

As shown in FIGS. 1 and 2, four pairs of electrodes 40 are provided on the first surface 12 and the second surface 13 of the piezoelectric element 10 such that each pair sandwiches the piezoelectric element 10 in a thickness direction thereof. The four pairs of electrodes 40 can be independently applied with voltage. The electrode 40 is formed to have a V-shape in a plan view. The electrode is disposed on the non-fixed part 10c of the piezoelectric element 10 along a corner of a boundary between the non-fixed part 10c and the first fixed part 10a. That is, the electrodes 40 are disposed at all the four corners of the non-fixed part 10c of the piezoelectric element 10. Further, as shown in FIG. 2, portions of the electrodes 40 located on the second surface 13 side of the piezoelectric element 10 are brought into contact with the inner circumferential surface of the restriction section 30.

The optical device A is configured that, when vertically installed, the piezoelectric element 10, the electrodes 40, and a center of gravity G of the optical element 20 are set to have a particular positional relation. The vertical installation means an installation state of the optical device A in which the sheet-shaped piezoelectric element 10 is orthogonal to the horizontal plane.

When the optical device A is vertically installed, FIG. 1 represents a plan view of the optical device A when viewed in the horizontal direction, and FIG. 2 represents a sectional view of the optical device A when viewing, in the vertical direction, a section of the optical device cut in the horizontal direction. Hereinafter, positional relation of the individual components will be explained with reference to FIGS. 1 and 2 supposing that these figures show the optical device A in the vertical installation state.

As shown in FIG. 2, the piezoelectric element 10 is disposed at a position in which the piezoelectric element does not overlap with the center of gravity G of the optical element 20 when the optical device A in the vertical installation state is viewed in the vertical direction. In other words, the center of gravity G of the optical element 20 is located outside a region sandwiched between a plane along the first surface 12 and a plane along the second surface 13. In this embodiment, as the optical element 20 is fixed to the first surface 12 of the piezoelectric element 10, the disposing condition described above is satisfied.

As shown in FIG. 1, two electrodes 40 (41, 42) located on the upper side are disposed on the upper side than the center of gravity G of the optical element 20. Further, as shown in FIGS. 1 and 2, these two electrodes 40 (41, 42) are respectively disposed on the right and left sides of a vertical plane GS which passes the center of gravity G of the optical element 20 and is orthogonal to the piezoelectric element 10. In this embodiment, as the electrodes 40 are disposed at all the four corners of the quadrangle non-fixed part 10*c* of the piezoelectric element 10, the disposing condition described above is satisfied.

Figure 4:
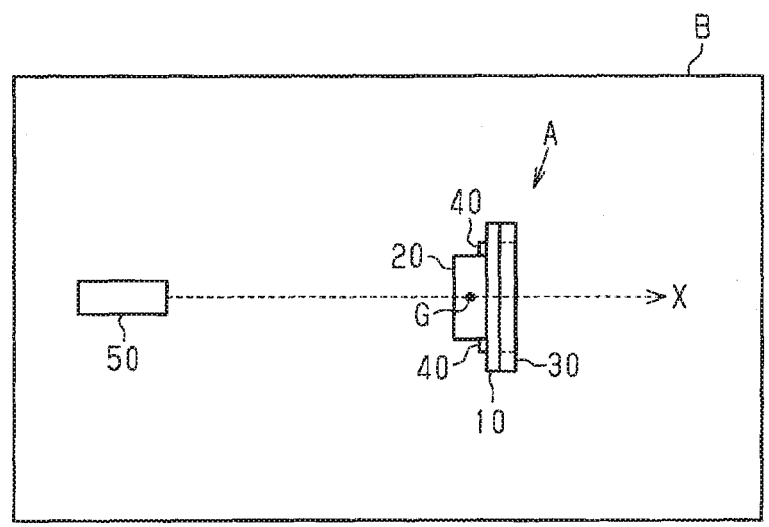
FIG. 4 is a schematic view of an optical apparatus including the optical device.

The optical device A can be used as a component for reducing speckle in a known optical apparatus utilizing laser light. For example, as shown in FIG. 4, in an optical apparatus B which outputs laser light from an optical source 50, the optical device A is disposed on an optical axis X of the laser light in use. Examples of the optical apparatus include a projector, a laser printer, an exposure apparatus, an optical fiber amplifier, a spectroscope, a laser measurement apparatus, an optical pickup apparatus, an optical exposure apparatus, an optical measurement apparatus, a polarization analyzer, a polarization mode dispersion compensation system, a CCD sensor, a CMOS sensor, a phase difference measuring apparatus, a laser machining apparatus, a medical equipment, a micro machine, a head up display (HUD) for automobile, an illumination apparatus, and a 3DH display apparatus.

As an action of this embodiment, operations of the optical device A will be explained as to individual cases in which the optical device A is installed vertically and 10 horizontally. Hereinafter, individual electrodes 40 are explained such that a first electrode 41 refers to an upper right electrode in FIG. 1, a second electrode 42 refers to an upper left electrode in FIG. 1, a third electrode 43 refers to a lower left electrode in FIG. 1, and a fourth electrode 44 refers to a lower right electrode in FIG. 1.

Firstly, explanation will be made as to the case in which the optical device A is installed vertically.

Figure 5:
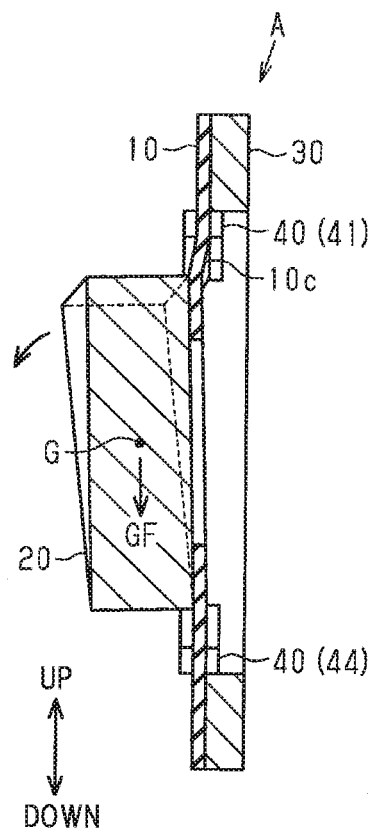
FIG. 5 is an explanatory diagram showing displacement of an optical element when installing the optical device vertically.

As shown in FIG. 5, in the optical device A placed in the vertical installation state, voltage is applied to one of the electrodes 40 on the upper side than the center of gravity G of the optical element 20, that is, the first electrode 41. In response to the voltage application, the piezoelectric element 10 contracts at a portion sandwiched between a pair of the first electrodes 41. Simultaneously, a periphery of this portion sandwiched between the pair of first electrodes 41 in the movable area (non-fixed part 10*c*) expands. Consequently, as the periphery of the portion sandwiched between the pair of first electrodes 41 in the movable area (non-fixed part 10*c*) bends, a stress based on this bending acts on the optical element 20.

In this case, as the piezoelectric element 10 is disposed at the position not overlapping with the center of gravity G of the optical element 20, a part of the stress based on the bending acts as a force pushing the optical element 20 in a back and force direction. The optical element 20 inclines so as to tilt the corner side of the first electrodes 41 side thereof forward by cooperation between the pushing force in the back and force direction and a force GF in a gravity force direction which is based on a tare weight acting on the center of gravity G of the optical element 20.

As shown in FIG. 7, the optical device A performs the expansion and contraction operation of the piezoelectric element 10. at plural particular portions of the movable area, at different timings to displace a posture of the optical element 20 in various manners. Specifically, voltage is applied to the first electrode 41 and the second electrode 42, which are respectively disposed on the right and left sides of the vertical plane GS that passes the center of gravity G of the optical element 20 and is orthogonal to the piezoelectric element 10, with a predetermined cycle in a manner of making the application timing differ between these electrodes. In this case, the posture of the optical element 20 changes continuously so as to shift between a state in which the optical element 20 tilts obliquely such that a portion of the optical element 20 in the vicinity of the first electrode 41 moves away from the restriction section 30 (see FIG. 7A) and a state in which the optical element 20 tilts obliquely such that a portion of the optical element 20 in the vicinity of the second electrode 42 moves away from the restriction section 30 (see FIG. 7B).

Next, explanation will be made as to the case in which the optical device A is installed horizontally. The horizontal installation means an installation state of the optical device A in which the sheet-shaped piezoelectric element 10 lies horizontally. Note that, in the horizontal installation state, the optical element 20 may be located on the upper side of the piezoelectric element 10 or the lower side of the piezoelectric element 10.

Figure 6:
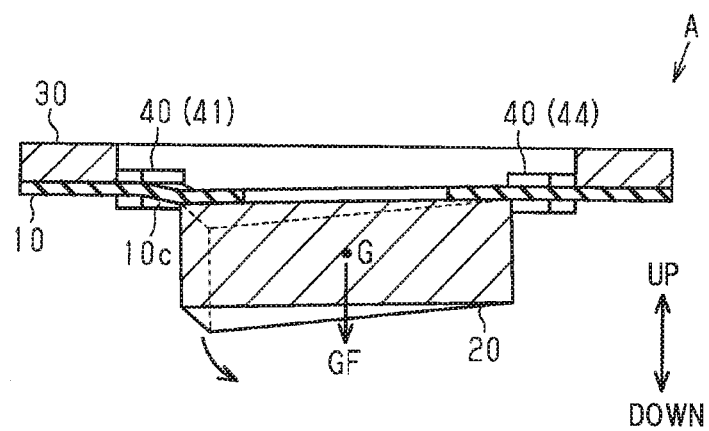
FIG. 6 is an explanatory diagram showing displacement of the optical element when installing the optical device horizontally.

As shown in FIG. 6, in the optical device A placed in the horizontal installation state, voltage is applied to one of the electrodes 40, for example, the first electrode 41. in response to the voltage application, the piezoelectric element 10 contracts at a portion sandwiched between the pair of first electrodes 41. Simultaneously, a periphery of this portion sandwiched between the pair of first electrodes 41 in the movable area (non-fixed part 10*c*) expands. Consequently, the periphery of the portion sandwiched between the pair of first electrodes 41 in the movable area (non-fixed part 10*c*) bends. As the part of the movable area bends, the optical element 20 partially sinks at the bent part due to the force GF in the gravity force direction based on the tare weight, and hence the optical element 20 tilts.

As shown in FIG. 7, the optical device A performs the expansion and contraction operation of the piezoelectric element 10 at plural particular portions of the movable area at different timings to displace a posture of the optical element 20 in various manners. Each of FIGS. 7A to 7D illustrates the optical device A in the horizontal installation state when viewed from the lower side.

For example, voltage is applied to the first electrode 41 and the second electrode 42, which is located at a corner adjacent to another corner where the first electrode 41 is provided, with a predetermined cycle in a manner of making the application timing differ between these electrodes. In this case, the posture of the optical element 20 changes continuously so as to shift between a state in which the optical element 20 tilts obliquely such that a portion of the optical element 20 in the vicinity of the first electrode 41 moves away from the restriction section 30 (see FIG. 7A) and a state in which the optical element 20 tilts obliquely such that a portion of the optical element 20 in the vicinity of the second electrode 42 moves away from the restriction section 30 see FIG. 7B).

Also, voltage is applied to the third electrode 43 and the fourth electrode 44, which is located at a corner adjacent to another corner where the third electrode 43 is provided, with a predetermined cycle in a manner of making the application timing differ between these electrodes. In this case, the posture of the optical element 20 changes continuously so as to shift between a state in which the optical element 20 tilts obliquely such that a portion of the optical element 20 in the vicinity of the third electrode 43 moves away from the restriction section 30 (see FIG. 7D) and a state in which the optical element 20 tilts obliquely such that a portion of the optical element 20 in the vicinity of the fourth electrode 44 moves away from the restriction section 30 (see FIG. 7C).

Figure 7A:
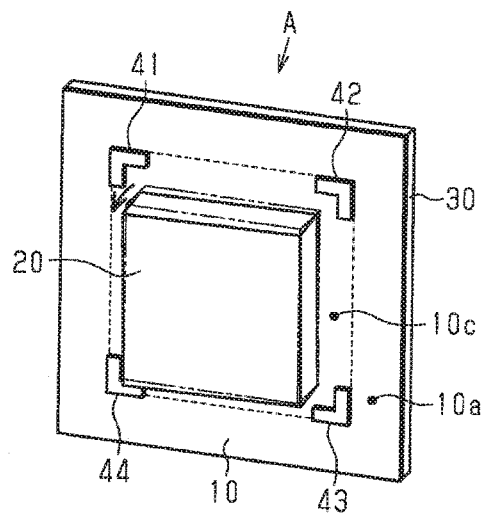
FIGS. 7A to 7D are explanatory diagrams relating to displacement of the optical element.
Figure 7B:
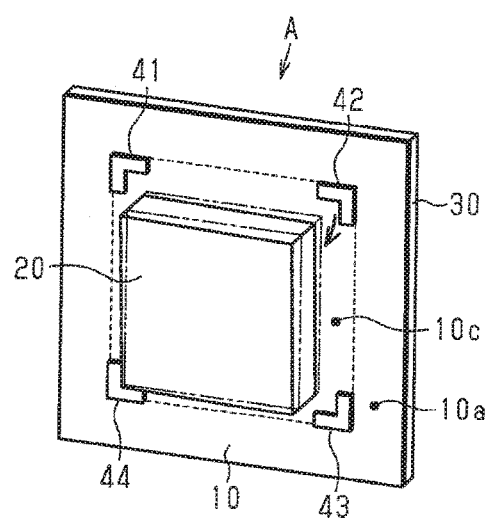
Figure 7C:
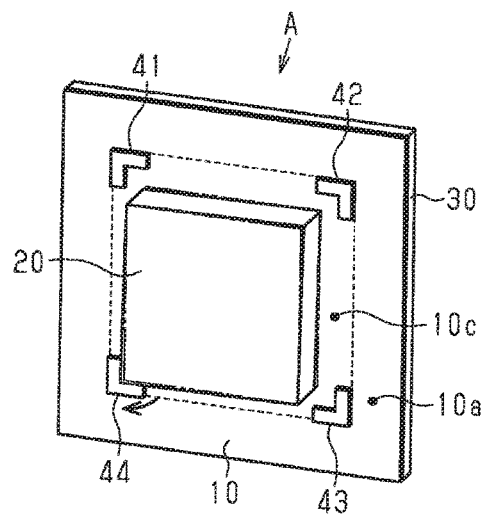
Figure 7D:
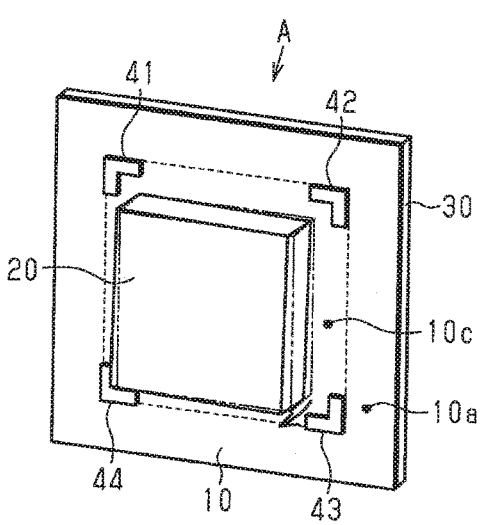

Similarly, in a case of applying voltage to the first electrode 41 and the fourth electrode 44 with a predetermined cycle in a manner of making the application timing differ between these electrodes, the posture of the optical element 20 changes continuously so as to shift between the state shown in FIG. 7A and the state shown in FIG. 7C. Also, in a case of applying voltage to the second electrode 42 and the third electrode 43 with a predetermined cycle in a manner of making the application timing differ between these electrodes, the posture of the optical element 20 changes continuously so as to shift between the state shown in FIG. 7B and the state shown in FIG. 7D. In a case of applying voltage to three or all of the first to fourth electrodes 41 to 44 with a predetermined cycle in a manner of making the application timing differ between these electrodes, the optical element 20 displaces continuously so as to shift between the individual states shown in FIGS. 7A to 7D while tilting in further complicated and various manners.

In this manner, the optical device A according to the embodiment can displace the optical element 20 in a direction of changing the inclination angle thereof with respect to the optical axis, in both cases where the optical device is vertically installed and horizontally installed.

In this embodiment, the first electrode 41 and the second electrode 42, the second electrode 42 and the third electrode 43, the third electrode 43 and the fourth electrode 44, and the fourth electrode 44 and the first electrode 41 are disposed at respective pairs of the adjacent corners in the movable area of the piezoelectric element 10. This configuration can displace the optical element 20 more largely. This mechanism is estimated as follow.

As shown in FIG. 1, the electrodes 40 are disposed at the respective corners in the movable area (non-fixed part 10c) of the piezoelectric element 10. Thus, for example, when voltage is applied to the first electrode 41, the periphery of the corner in the movable area where the first electrode 41 is disposed expands in two directions along the two sides forming this corner (left direction and downward direction in FIG. 1) and in a direction toward the center side of the optical device where the optical element 20 is located.

A force F1, based on the expansion in the direction toward the center side where the optical element 20 is located, is transmitted to the portion (second fixed part 10b) of the movable area glued to the optical element 20. A force F2, based on the expansion in the two directions along the two sides forming the corner, is transmitted to the adjacent corners (corners where the second electrode 42 and the fourth electrode 44 are disposed) sides along these two sides.

In this case, when voltage is also applied to the second electrode 42 disposed at the corner adjacent to the corner where the first electrode 41 is disposed, the periphery of the corner where the second electrode 42 is disposed also expands in the similar manner. Thus, a force F2 based on this expansion is transmitted to the corner side where the first electrode 41 is disposed from the corner where the second electrode 42 is disposed. As a result, in the movable area between the corner where the first electrode 41 is disposed and the corner where the second electrode 42 is disposed, there arises a portion (action point) at which the forces F2 based on the expansion in the directions along the common side forming these corners act to each other.

The position of the action point changes according to a voltage difference between voltages applied to the first electrode 41 and the second electrode 42. For example, when voltage applied to the first electrode 41 becomes relatively larger than voltage applied to the second electrode 42, the action point shifts to the corner side where the second electrode 42 is disposed. In contrast, when voltage applied to the first electrode becomes relatively smaller than voltage applied to the second electrode, the action point shifts to the corner side where the first electrode 41 is disposed. Thus, in a case of applying voltage to the first electrode 41 and the second electrode 42 with a predetermined cycle in a manner of making the application timing differ between these electrodes, the position of the action point is kept to move continuously or intermittently according to the change of voltage applied to the first electrode 41 and the second electrode 42.

As the force F1 based on the expansion in the direction toward the center side of the optical device acts as a force for tilting the optical element 20 and the action point is kept to move, the movable area of the piezoelectric element 10 moves like waves. Consequently, the optical element 20 displaces more largely.

Next, effects of the embodiment will be described.

(1) The optical device A includes the sheet-shaped piezoelectric element 10, the restriction section 30 which is attached to the piezoelectric element 10 and restricts the movable area (non-fixed part 10c) of the piezoelectric element 10 to a predetermined region, the optical element 20 attached to the movable area of the piezoelectric element 10, and a plurality of the electrodes 40 which are disposed on the piezoelectric element 10 and capable of being applied with voltage independently.

The optical device A is used in the vertical installation state in which the piezoelectric element 10 is orthogonal to the horizontal plane. When viewing the optical device A in the in an up-down direction (vertical direction), the piezoelectric element 10 is disposed at the position not overlapping with the center of gravity G of the optical element 20. The electrodes 40 (41, 42) are each disposed on the upper side than the center of gravity G of the optical element 20, and are respectively disposed on both sides of the vertical plane GS which passes the center of gravity G of the optical element 20 and is orthogonal to the piezoelectric element 10.

This configuration can displace the optical element 20 in the direction of changing the inclination angle thereof with respect to the optical axis, in the case of disposing the optical device A on the optical axis of laser light in use. As the optical element 20 is displaced in the direction of changing the inclination angle thereof with respect to the optical axis, speckle can be further reduced as compared with a case where the optical element 20 is displaced on a predetermined plane. Further, diffraction fringes can be eliminated.

(2) The optical device A includes the sheet-shaped piezoelectric element 10, the restriction section 30 which is attached to the piezoelectric element 10 and restricts the movable area (non-fixed part 10c) of the piezoelectric element 10 to the quadrangular region, the optical element 20 attached to the movable area of the piezoelectric element 10, and a plurality of the electrodes 40 which are disposed on the piezoelectric element 10 and capable of being applied with voltage independently. The electrodes 40 are disposed at the adjacent two corners in the movable area. The piezoelectric element 10 expands and contracts based on voltage applied to the electrodes in a manner that the periphery of the corner where the electrode 40 is disposed in the movable area expands and contracts in the two directions along the two sides forming this corner.

This configuration can displace the optical element 20 in the direction of changing the inclination angle thereof with respect to the optical axis, in the case of disposing the optical device A on the optical axis of laser light in use. As the optical element 20 is displaced in the direction of changing the inclination angle thereof with respect to the optical axis, speckle can be further reduced as compared with the case where the optical element 20 is displaced on the predetermined plane. Further, diffraction fringes can be eliminated.

(3) The movable area (non-fixed part 10c) has the quadrangle shape. The electrodes 40 are disposed at the adjacent two corners and further at the two corners located at diagonal positions of the adjacent two corners, in the movable area. This configuration can displace the optical element 20 in further complicated and various manners as compared with the case where the electrodes 40 are disposed only at the adjacent two corners in the movable area.

(4) The electrode 40 is formed to have the V-shape along the corner where the electrode 40 is disposed.

This configuration can suitably generate, when voltage is applied to the electrode 40, the force F1 based on the expansion in the direction toward the center side of the optical device where the optical element 20 is located and the force F2 based on the expansion in the two directions along the two sides forming the corner.

(5) At the position adjacent to the restriction section 30 side of the portion where the electrode 40 is disposed, the piezoelectric element 10 includes the portion (first fixed part 10a) which is glued to the restriction section 30 and is restricted in expansion and contraction of the piezoelectric element 10.

According to this configuration, when voltage is applied to the electrode 40, the expansion of the piezoelectric element 10 toward the restriction section 30 side is restricted. Thus, the piezoelectric element 10 largely expands toward the optical element 20 side by a degree corresponding to the restriction of expansion. Consequently, a larger force can be effected on the optical element 20. As a result, the maximum displacement amount (maximum displacement angle) of the optical element 20 can be increased, and voltage necessary for obtaining a particular displacement amount can be reduced.

The embodiment can also be modified and realized in the following manners.

The optical device A may be used in an installation state other than the vertical installation state and the horizontal installation state, that is, an installation state (oblique installation state) in which the sheet-shaped piezoelectric element 10 crosses both the horizontal plane and a plane orthogonal to the horizontal plane. In this case, the optical device operates substantially in the similar manner as the case of the vertical installation state.

In the case of using the optical device A in the vertical installation state, voltage may be applied at predetermined timings also to the electrodes 40 (43, 44) disposed on the lower side than the center of gravity G of the optical element 20. In this case, the optical element 20 can be displaced in further complicated and various manners.

Figure 8A:
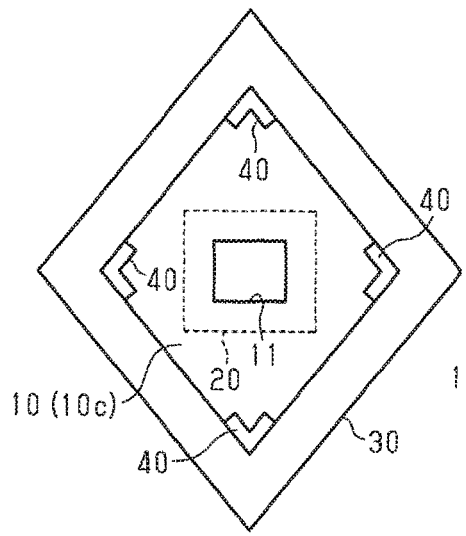
FIGS. 8A and 8B are explanatory diagrams of modified examples relating to a movable area.
Figure 8B:
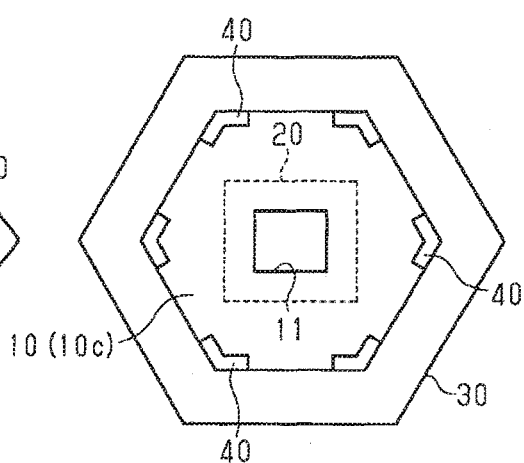

A shape (outer shape) of the movable area (non-fixed part 10c) of the piezoelectric element 10 may be changed within a range of a polygonal shape. For example, as shown in FIG. 8A, the movable area may be a polygon in which corners have different angles. Alternatively, as shown in FIG. 8B, the movable area may be a polygon having five or more sides such as a hexagon or an octagon. In a case where the movable area of the piezoelectric element 10 is a polygon or an octagon, the electrodes 40 are preferably disposed at adjacent two corners and further at two corners located at diagonal positions of the adjacent two corners, in the movable area. The number of the electrodes 40 in the movable area of the piezoelectric element 10 may be changed. For example, the third electrode 43 and the fourth electrode 44 may be eliminated. In a case where the optical device A. is used in the vertical installation state or an installation state of crossing the horizontal plane, preferably, the electrodes 40 are disposed at two corners located on the upper side than the center of gravity G of the optical element 20 so that the optical element 20 does not displace in a direction largely against the gravity direction.

In a case where the optical device A is specialized for use in the vertical installation state, the electrodes 40 may not be disposed at adjacent two corners in the movable area. The electrodes 40 only have to be each disposed on the upper side than the center of gravity G of the optical element 20, and respectively disposed on both sides of the vertical plane GS which passes the center of gravity G of the optical element 20 and is orthogonal to the piezoelectric element 10. Thus, in this case, shape (outer shape) of the movable area of the piezoelectric element 10 may be a shape having no corner such as a circle or an ellipse.

In a case where the optical device A is specialized for use in an installation state other than the vertical installation state, the electrodes 40 only have to be disposed ay adjacent two corners in the movable area. The electrodes 40 may not be arranged in such a way that they are each disposed on the upper side than the center of gravity G of the optical element 20, and respectively disposed on both sides of the vertical plane GS which passes the center of gravity G of the optical element 20 and is orthogonal to the piezoelectric element 10.

Figure 9A:
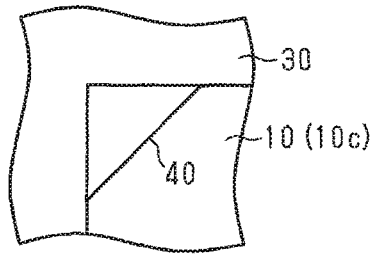
FIGS. 9A to 9D are explanatory diagrams of modified examples relating to an electrode.
Figure 9B:
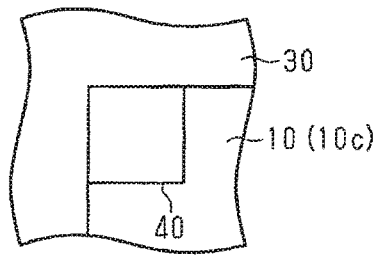
Figure 9C:
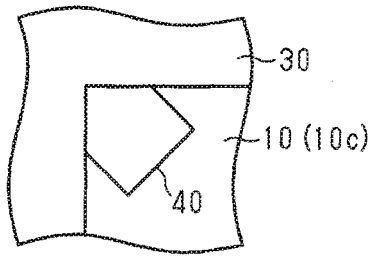
Figure 9D:
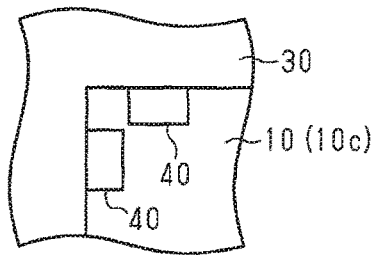

A shape and arrangement of the individual electrodes 40 may be changed. For example, as shown in FIG. 9. the electrode 40 may have a triangular shape having one side which is not along the side (edge) of the movable area (non-fixed part 10c) of the piezoelectric element 10 (FIG. 9A), the electrode 40 may have a quadrangular shape having two sides none of which are along the sides of the movable area (FIG. 9B), or the electrode 40 may have a pentagonal shape having three sides none of which are along the sides of the movable area (FIG. 9C). Alternatively, as shown in FIG. 9D, the electrode may be divided into a plurality of electrodes 40 that are applied with the same voltage. Alternatively, the electrode 40 may be disposed at a position away from the sides (edges) of the movable area (non-fixed part 10c) of the piezoelectric element 10.

An outer shape of the optical element 20 is not limited to that of the embodiment but may be other shapes such as a circle, an ellipse or a polygon other than a quadrangle.

The optical device may be configured to include a plurality of the piezoelectric elements 10. For example, in the optical device A shown in FIG. 1, the piezoelectric element 10 may be divided into two piezoelectric elements, that is, one piezoelectric element 10 in which the first electrode 41 and the second electrode 42 are arranged and the other piezoelectric element 10 in which the third electrode 43 and the fourth electrode 44 are arranged.

The method of fixing the piezoelectric element 10 to the optical element 20 and the restriction section 30 is not limited to the gluing. For example, the piezoelectric element 10 may be fixed to the restriction section 30 in a manner that the restriction section 30 is divided into two members in the thickness direction and the piezoelectric element 10 is sandwiched between the two members.

Next, technical concept grasped from the embodiment and the modified examples will be described.

(A) In the optical device, the electrode is formed to have the V-shape along the corner in the movable area.

(B) In the optical device, the piezoelectric element has the portion where the expansion and contraction of the piezoelectric element is restricted, at the position adjacent to the restriction section side in the portion where the electrode is disposed.

What is claimed is:

1. An optical device comprising:
a piezoelectric element of a sheet shape;
a restriction section attached to the piezoelectric element, the restriction section configured to restrict a movable area in the piezoelectric element to a polygonal predetermined region;
an optical element attached to the movable area of the piezoelectric element; and
a plurality of electrodes disposed on the piezoelectric element, the plurality of electrodes configured to be applied with voltage independently, wherein:
the electrodes are disposed at adjacent two corners in the movable area; and
the piezoelectric element expands and contracts based on voltage applied to the electrodes in a manner that a periphery of the corner where the electrode is disposed in the movable area expands and contracts in multiple directions including two directions along two sides forming the corner.

2. The optical device according to claim 1, wherein:
the optical device is used in an installation state in which the piezoelectric element crosses a horizontal plane; and
the electrodes are disposed at adjacent two corners in the movable area that locate on an upper side than a center of gravity of the optical element.

3. The optical device according to claim 1, wherein:
the movable area has a quadrangle shape, a hexagonal shape or an octagonal shape; and
the electrodes are disposed at the adjacent two corners and further at two corners located at diagonal positions of the adjacent two corners, in the movable area.

4. An optical device comprising:
a piezoelectric element of a sheet shape;
a restriction section attached to the piezoelectric element, the restriction section configured to restrict a movable area in the piezoelectric element to a predetermined region;
an optical element attached to the movable area of the piezoelectric element; and
a plurality of electrodes disposed on the piezoelectric element, the plurality of electrodes configured to be applied with voltage independently, wherein:
the optical device is used in an installation state in which the piezoelectric element is orthogonal to a horizontal plane;
the piezoelectric element is disposed at a position in which the piezoelectric element does not overlap with a center of gravity of the optical element when the optical device is viewed in a vertical direction; and
the electrodes are each disposed on an upper side than the center of gravity of the optical element, and are respectively disposed on both sides of a vertical plane which passes the center of gravity of the optical element and is orthogonal to the piezoelectric element.

* * * * *